United States Patent
Sing et al.

(10) Patent No.: US 11,950,740 B2
(45) Date of Patent: Apr. 9, 2024

(54) DOMESTIC APPLIANCE AND METHOD FOR PRODUCING A DOMESTIC APPLIANCE

(71) Applicant: BSH Hausgeräte GmbH, Munich (DE)

(72) Inventors: Alexander Sing, Wittislingen (DE); Heiko Fritz, Herbrechtingen (DE)

(73) Assignee: BSH Hausgeräte GmbH, Munich (DE)

( * ) Notice: Subject to any disclaimer, the term of this patent is extended or adjusted under 35 U.S.C. 154(b) by 500 days.

(21) Appl. No.: 17/279,666

(22) PCT Filed: Sep. 30, 2019

(86) PCT No.: PCT/EP2019/076404
§ 371 (c)(1),
(2) Date: Mar. 25, 2021

(87) PCT Pub. No.: WO2020/074298
PCT Pub. Date: Apr. 16, 2020

(65) Prior Publication Data
US 2022/0031144 A1 Feb. 3, 2022

(30) Foreign Application Priority Data
Oct. 12, 2018 (DE) .................. 10 2018 217 551.9

(51) Int. Cl.
*A47L 15/00* (2006.01)
*A47L 15/42* (2006.01)
(Continued)

(52) U.S. Cl.
CPC ...... *A47L 15/4209* (2016.11); *B29C 44/1228* (2013.01); *B29K 2075/00* (2013.01);
(Continued)

(58) Field of Classification Search
CPC ............ A47L 15/4209; B29K 2075/00; B29K 2995/0002; B29K 2995/0015;
(Continued)

(56) References Cited

U.S. PATENT DOCUMENTS 1,903,934 A * 4/1933 Munters .................. F25B 15/10
62/502
4,735,284 A 4/1988 Gahlau
(Continued)

FOREIGN PATENT DOCUMENTS

CN 101332693 A 12/2008
CN 107053809 A 8/2017
(Continued)

OTHER PUBLICATIONS

EP3409181 English translation (Year: 2018).*
(Continued)

*Primary Examiner* — Janet M Wilkens
(74) *Attorney, Agent, or Firm* — Michael E. Tschupp; Andre Pallapies; Brando G. Braun (57) ABSTRACT

A household appliance includes a functional compartment, and an insulation arrangement provided on an outer side of the functional compartment for thermal and/or acoustic insulation of the functional compartment. The insulation arrangement includes an insulation element which is made in one piece from a plastic material selected such that a surface of the insulation element in facing relation to the functional compartment adheres to the functional compartment and is separable therefrom in a non-destructive manner. A component arranged outside the functional compartment is at least substantially encapsulated in the insulation element.

17 Claims, 9 Drawing Sheets

(51) Int. Cl.
*B29C 44/12* (2006.01)
*B29K 75/00* (2006.01)
*B29L 31/00* (2006.01)

(52) U.S. Cl.
CPC ............... *B29K 2995/0002* (2013.01); *B29K 2995/0015* (2013.01); *B29K 2995/0091* (2013.01); *B29L 2031/762* (2013.01)

(58) Field of Classification Search
CPC ........ B29K 2995/0091; B29C 44/1228; B29L 2031/761; B29L 2031/762; G10K 11/168
USPC .......................................... 312/406, 400, 228
See application file for complete search history.

(56) References Cited

U.S. PATENT DOCUMENTS

| | | | |
|---|---|---|---|
| 7,409,959 B2* | 8/2008 | Retsema | A47L 15/4251 |
| | | | 134/201 |
| 9,453,296 B2* | 9/2016 | Rockwell | F25D 23/00 |
| 2006/0165947 A1* | 7/2006 | Kellogg | B29C 67/246 |
| | | | 428/71 |
| 2008/0317996 A1* | 12/2008 | Rockwell | B31D 3/002 |
| | | | 428/68 |
| 2011/0168217 A1 | 7/2011 | Carmona | |
| 2012/0012420 A1* | 1/2012 | Classen | A47L 15/4209 |
| | | | 181/294 |
| 2012/0298154 A1* | 11/2012 | Rockwell | A47L 15/4209 |
| | | | 134/184 |
| 2013/0106264 A1 | 5/2013 | Fritz | |
| 2015/0368852 A1* | 12/2015 | Rockwell | D06F 58/04 |
| | | | 34/602 |

FOREIGN PATENT DOCUMENTS

| | | | |
|---|---|---|---|
| CN | 207351039 U | | 5/2018 |
| DE | 4110291 A1 | | 10/1992 |
| DE | 4110292 A1 | | 10/1992 |
| DE | 4227957 A1 | | 2/1994 |
| DE | 10118632 A1 | | 10/2002 |
| EP | 3092935 A1 | | 11/2016 |
| EP | 3409181 | * | 12/2018 |
| EP | 3895595 | * | 10/2021 |
| WO | 2017079501 | * | 5/2017 |

OTHER PUBLICATIONS

International Search Report PCT/EP2019/076404 dated Nov. 6, 2019.
Report of Examination DE 10 2018 217 551.9 dated Oct. 15, 2021.
National Search Report CN 2019800670358 dated Sep. 27, 2023.

* cited by examiner

DOMESTIC APPLIANCE AND METHOD FOR PRODUCING A DOMESTIC APPLIANCE

CROSS-REFERENCES TO RELATED APPLICATIONS

This application is the U.S. National Stage of International Application No. PCT/EP2019/076404, filed Sep. 30, 2019, which designated the United States and has been published as International Publication No. WO 2020/074298 A1 and which claims the priority of German Patent Application, Serial No. 10 2018 217 551.9, filed Oct. 12, 2018, pursuant to 35 U.S.C. 119(a)-(d).

BACKGROUND OF THE INVENTION

The present invention relates to a household appliance, in particular to a household dishwasher, as well as to a method for producing such a household appliance, in particular such a household dishwasher.

A household dishwasher can have elements that are accommodated in an area between a dishwashing compartment of the household dishwasher and an outer casing of said dishwasher. The elements can for example be water pockets, water-conducting elements, plastic elements for introducing a force into the dishwashing compartment, air-conducting channels or elements, electrical leads or components or the like. For production reasons free space must be provided around these elements, in order to compensate for different position tolerances.

For acoustic insulation of a dishwashing compartment of a household dishwasher bitumen mats can be applied to the outside of the dishwashing compartment. These bitumen mats can be glued to the outside of the dishwashing compartment with a hot melt adhesive for example. Such bitumen mats have a high thermal conductivity capacitance however and conduct the heat away from the dishwashing compartment. If the proportion of the surface of the dishwashing compartment covered by the bitumen mats is reduced, the energy consumption of the household dishwasher is able to be reduced. This reduction in the surface covered by the bitumen mats however results in the noise emitted by the household dishwasher increasing.

Publication EP 3 092 935 A1 discloses an arrangement for thermal and acoustic insulation of a receiving area of a household dishwasher. The arrangement comprises a first insulation element for thermal insulation of the receiving area and a second insulation element for acoustic insulation of the receiving area, wherein the first insulation element is arranged between the receiving area and the second insulation element and wherein the first insulation element is foamed directly to the receiving area. In this case lines of a heat exchanger can be laid within the first insulation element, which are surrounded by the foam material of the first insulation element.

BRIEF SUMMARY OF THE INVENTION

Against this background, an object of the present invention is to make available an improved household appliance, in particular an improved household dishwasher.

Accordingly a household appliance, in particular a household dishwasher, having a functional compartment, in particular a dishwashing compartment, an insulation arrangement provided on the outside of the functional compartment for thermal and/or acoustic insulation of the functional compartment, in particular of the dishwashing compartment, and having a component arranged outside the functional compartment is proposed. In this case the insulation arrangement has an insulation element, wherein the insulation element is made in one piece from a plastic material, wherein the component is encapsulated at least to some extent by the plastic material, and wherein, in a cured and/or cross-linked state, the plastic material has preferably adhesive properties so that the insulation element adheres to the functional compartment, in particular to the dishwashing compartment, with a surface directed towards the dishwashing compartment and can be separated therefrom in a non-destructive manner.

The fact that the component is encapsulated by the plastic material enables additional functions to be integrated into the insulation element or into the insulation arrangement. Thus a full use of the available space in the insulation arrangement without the provision of tolerances is possible. Component collisions can further be avoided. In the event of the component being an active component, such as a motor or a fan for example, a better acoustic damping of the component can be achieved. The fact that the insulation element, as a result of its preferably adhesive properties, only adheres to the functional compartment, in particular to the dishwashing compartment, enables said element, at the end of life of the household appliance, in particular of the household dishwasher, to be removed from the functional compartment again in a simple manner and the components of the household appliance, in particular of the household dishwasher, can be put back into a cycle of potential recyclables individually and without contaminations.

Preferably the insulation element is made entirely from the plastic material. "In one piece" in this case means that the insulation element only features one material, namely the aforementioned plastic material. The functional compartment, in particular dishwashing compartment, is in particular cuboid in shape and comprises a floor, a rear wall, a roof, two side walls lying opposite one another and a door. The insulation arrangement in this case can be provided on the rear wall, the roof, on the side walls and/or on the door respectively. The insulation arrangement can further also be provided on the floor. The functional compartment, in particular dishwashing compartment, and the door enclose a functional space, in particular a dishwashing space of the household appliance, in particular of the household dishwasher. Items to be cleaned, in particular dishes to be washed, can be accommodated in the functional space, in particular in the dishwashing space. The insulation element can also be referred to as the first insulation element. The insulation element is suitable for thermal and/or acoustic insulation of the functional compartment, in particular of the dishwashing compartment. The insulation element can therefore also be referred to as the thermal and/or acoustic insulation element.

"On the outside" in this case means directed away from the functional compartment, in particular the dishwashing compartment. For example the rear wall, the floor, the roof, the side walls and/or the door each have an inner side directed towards the functional space, in particular the dishwashing space, and an outer side directed away from the functional space, in particular the dishwashing space. The insulation arrangement is provided on the outer side in each case. The ability of the insulation element to be removed "in a non-destructive manner" from the functional compartment, in particular from the dishwashing compartment, is to be understood as the insulation element being able to be pulled off or removed from the functional compartment, in particular from the dishwashing compartment. In such a case however slight residues can be left on the functional compartment, in particular on the dishwashing compartment. This means that the insulation element is able to be released easily from the functional compartment, in particular from the dishwashing compartment, but residues can be left on the functional compartment, in particular on the dishwashing compartment. These can be removed by rubbing. In particular the insulation element can be separated from the functional compartment, in particular from the dishwashing compartment, without aids, such as solvents for example. The connection between the insulation element and the functional compartment, in particular dishwashing compartment, can be a weakly-adhesive glue connection.

The plastic material can have a number of components, which are mixed to produce the insulation element and react chemically with one another in such a way that the plastic material fully cures and/or cross-links. The plastic material itself has the preferably adhesive or preferably gluing properties. "Adhesion" is to be understood here as the property of the plastic material of the surface of the insulation element directed towards the functional compartment, in particular dishwashing compartment, interacting with an outer side of the functional compartment, in particular of the dishwashing compartment, in such a way that the insulation element adheres to the functional compartment, in particular to the dishwashing compartment. The adhesion can be based in this case on molecular interactions between the plastic material and the material of the functional compartment, in particular of the dishwashing compartment. The adhesion can furthermore be based on physical-mechanical forces. For example the plastic material can clamp or hook into microscopically small pores and/or recesses of the functional compartment, in particular of the dishwashing compartment. In particular the insulation element is joined to the functional compartment, in particular to the dishwashing compartment, without adhesive. As stated previously the plastic material of the insulation element itself preferably comprises adhesive or preferably gluing properties. This enables an adhesive for connecting the insulation element to the functional compartment, in particular dishwashing compartment, to be dispensed with. This simplifies production of the household appliance, in particular of the household dishwasher, and makes possible improved recycling of the materials used.

The fact that the component is "encapsulated" by the plastic material is to be understood in particular as the plastic material being poured in liquid form onto or around the component and thereby foaming onto it. The plastic material then encloses the component entirely or at least to some extent, so that the component is arranged entirely or at least partly within the insulation element.

In accordance with one form of embodiment the plastic material is a polyurethane, in particular a foam polyurethane.

The polyurethane preferably has an open-pore structure. The plastic material is thus compressible, so that during compression air can escape from the plastic material. Other suitable plastic materials can also be used. In particular the plastic material has viscoelastic properties. "Viscoelasticity" is referred to as a partly elastic, partly viscous material behavior. Viscoelastic materials thus combine properties of solids and liquids.

In accordance with a further form of embodiment the component is a water-conducting component, an air-conducting component, a water pocket, a plastic part for introducing a force into the dishwashing container, a fan, a motor, a spring, a cable, an electrical lead or component, a fleece, a mat, a plastic component, a foam, a bitumen or the like.

In particular the component can be an active or a passive component. An active component is a fan or a motor for example. A passive component is an air-conducting component, a water pocket, a plastic part for introducing a force into the dishwashing container, a fan, a motor, a spring, a cable, an electrical lead or component, a fleece, a mat, a plastic component, a foam, a bitumen or the like, as mentioned above.

In accordance with a further form of embodiment the plastic material surrounds the component entirely.

This means that the component is surrounded by the plastic material on all sides or is enclosed in said material.

In accordance with a further form of embodiment the insulation arrangement has a first insulation element, which is made of the plastic material, and a second insulation element, wherein the first insulation element is arranged between the functional compartment, in particular the dishwashing compartment, and the second insulation element.

The second insulation element is optional. The second insulation element can serve to acoustically insulate the functional compartment, in particular the dishwashing compartment. The second insulation element can be referred to as an acoustic insulation element. The fact that the first insulation element is arranged between the functional compartment, in particular the dishwashing compartment, and the second insulation element enables the second insulation element to not remove any heat from the functional compartment, in particular the dishwashing compartment. This improves the energy efficiency of the household appliance, in particular of the household dishwasher. The second insulation element serves in particular as a bulk layer. The second insulation element improves the acoustic properties of the insulation arrangement. For example for the case in which the encapsulated component is a fixing element, the second insulation element can be fixed with the aid of the component to the first insulation element. Preferably the second insulation element is made of a bitumen material. In particular the second insulation element is made of a metal or stone-filled bitumen material. As an alternative the second insulation element can also be made of a metal or stone-filled plastic material.

In accordance with a further form of embodiment the component is in contact with the second insulation element.

BRIEF DESCRIPTION OF THE DRAWINGS

For example the component lies with one surface on the second insulation element. This surface is then not covered with the plastic material of the first insulation element. Thus at least one surface of the component is not encapsulated with the plastic material.

DETAILED DESCRIPTION OF EXEMPLARY EMBODIMENTS OF THE PRESENT INVENTION

In accordance with a further form of embodiment the plastic material is encapsulated onto the second insulation element.

This enables a material-bonded connection to be achieved between the first insulation element and the second insulation element. In particular the first insulation element adheres to the second insulation element in such a way that said element is able to be separated from it in a non-destructive and residue-free manner. This enables the materials of the first insulation element and the second insulation element to be recycled separately from one another. To facilitate the separation a separation layer can also be arranged between the insulation elements. The insulation elements can also be connected to one another non-releasably.

Furthermore a method is proposed for producing such a household appliance, in particular such a household dishwasher. The method comprises the steps: a) Provision of a functional compartment, in particular a dishwashing compartment, b) Provision of a component arranged outside the functional compartment, in particular the dishwashing compartment, c) Production of an insulation arrangement for thermal and/or acoustic insulation of the functional compartment, in particular the dishwashing compartment, wherein the insulation arrangement has an insulation element, wherein the insulation element is made of a plastic material in such a way that the plastic material encapsulates the component and wherein the plastic material, in a cured or cross-linked state, preferably has adhesive properties, and d) attaching the insulation arrangement to the outer side of the dishwashing compartment in such a way that the insulation element adheres to the functional compartment, in particular the dishwashing compartment with a surface directed towards the functional compartment, in particular the dishwashing compartment and is able to be separated from the latter in a non-destructive manner.

In the production of the insulation arrangement in particular the insulation element is produced in step c) in a mold. To this end not yet cured and/or not yet cross-linked plastic material is poured into the mold. The plastic material then foams up in the mold and fills the latter.

In accordance with one form of embodiment, in step c) the component is placed in a mold that is filled with the plastic material, so that the component is surrounded by the foam plastic material.

The mold is in particular a casting mold or die casting mold. The mold can have a lower mold part and an upper mold part. The component can be held in the desired position with wires or rods for example while being encapsulated with the plastic material. In particular in step c) the plastic material is encapsulated onto the second insulation element. To this end the second insulation element can be placed in the mold. Then, in step d), the complete insulation arrangement can be attached in its entirety to the functional compartment, in particular to the dishwashing compartment.

In accordance with a further form of embodiment the insulation arrangement is produced in step c) in such a way and is attached in step d) in such a way to the outer side of the functional compartment that the insulation arrangement has a first insulation element, which is made of the plastic material and has a second insulation element, wherein the first insulation element is arranged between the functional compartment, in particular the dishwashing compartment, and the second insulation element.

As previously mentioned, both insulation elements can be attached at the same time to the functional compartment, in particular the dishwashing compartment. As an alternative the insulation elements can also be attached one after another to the functional compartment, in particular the dishwashing compartment. In this case the first insulation element is first attached to the functional compartment, in particular the dishwashing compartment and subsequently the second insulation element is attached to the first insulation element.

Further possible implementations of the invention also include combinations not explicitly stated of features or forms of embodiment described previously or below with regard to the exemplary embodiments. In such cases the person skilled in the art will also add individual aspects as improvements or additions to the respective basic form of the invention.

Further advantageous embodiments and aspects of the invention are the subject matter of the dependent claims as well as of the exemplary embodiments of the invention described below. Furthermore the invention will be described in greater detail with the aid of preferred forms of embodiment, which refer to the enclosed figures.

In the figures.

Elements that are the same or have the same function have been provided with the same reference characters in the figures, unless otherwise specified.

Figure 1:
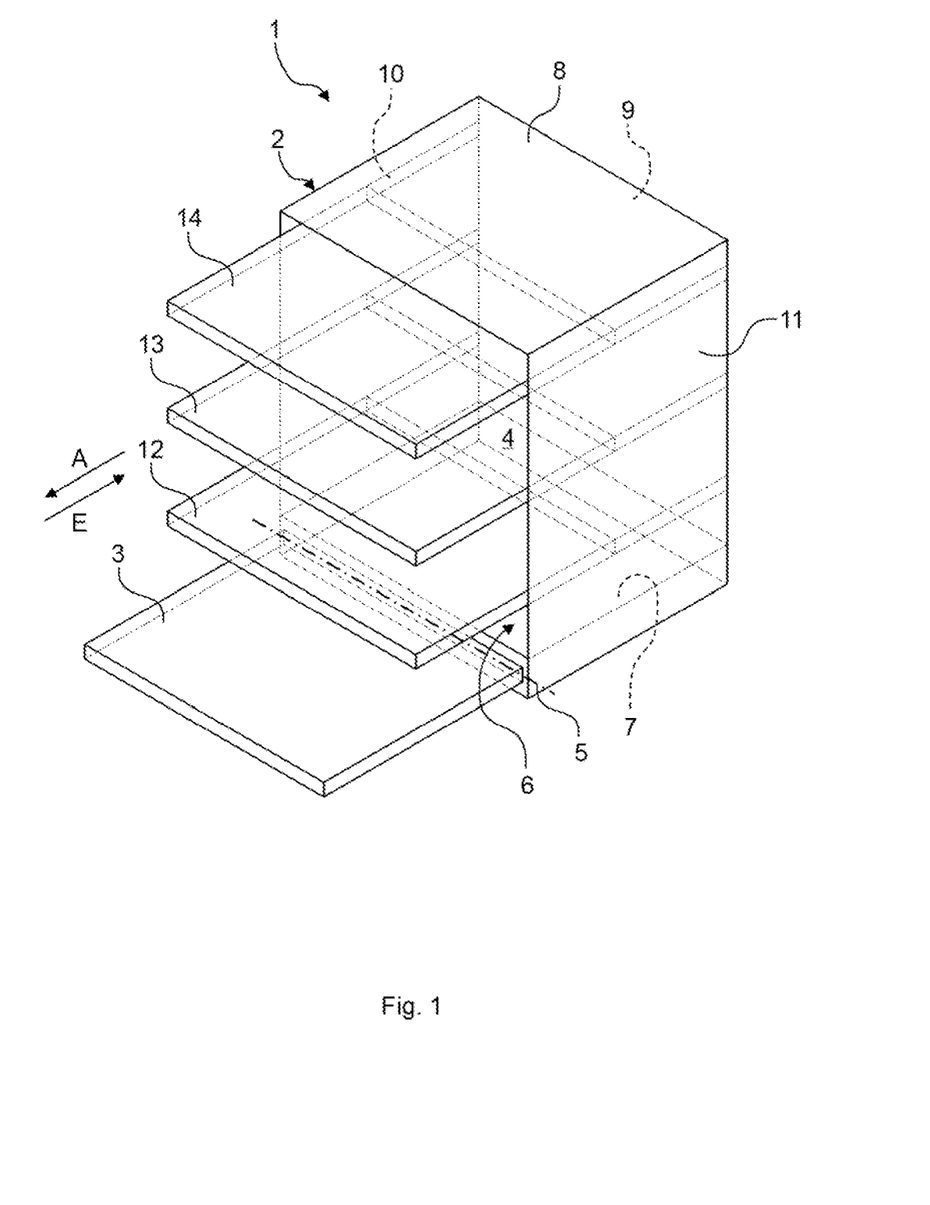
FIG. 1 shows a schematic perspective view of a form of embodiment of a household appliance embodied as a household dishwasher.

FIG. 1 shows a schematic perspective view of a form of embodiment of a household appliance 1 embodied as a household dishwasher. The household dishwasher 1 comprises a functional compartment embodied as a dishwashing compartment 2, which is able to be closed off, by a door 3, in a water-tight manner in particular. To this end a sealing ring can be provided between the door 3 and the dishwashing compartment 2. The dishwashing compartment 2 is preferably cuboid in shape. The dishwashing compartment 2 can be arranged in a housing of the household dishwasher 1. The dishwashing compartment 2 and the door 3 can form a dishwashing space 4 for washing dishes.

The door 3 is shown in FIG. 1 in its opened position. Pivoting the door 3 about a pivot axis 5 provided at the bottom end of it enables the door 3 to be closed or opened. With the aid of the door 3 a loading opening 6 of the dishwashing compartment 2 can be closed or opened. The dishwashing compartment 2 has a floor 7, a roof 8 arranged opposite to the floor 7, a rear wall 9 arranged opposite to the closed door 3 and two side walls 10, 11 arranged opposite to one another. The floor 7, the roof 8, the rear wall 9 and the side walls 10, 11 can be made of a sheet of stainless steel for example. As an alternative the floor 7 can be made of a plastic material.

The household dishwasher 1 further has at least one dishwashing receptacle 12 to 14. Preferably a number of dishwashing receptacles, for example three dishwashing receptacles 12 to 14 can be provided, wherein the dishwashing receptacle 12 can be a lower dishwashing receptacle or dish rack, the dishwashing receptacle 13 can be an upper dishwashing receptacle or dish rack and the dishwashing receptacle 14 can be a cutlery drawer. As FIG. 1 also shows, the dishwashing receptacles 12 to 14 are arranged above one another in the dishwashing compartment 2. Each dishwashing receptacle 12 to 14 is optionally able to be supported for movement into or out of the dishwashing compartment 2. In particular each dishwashing receptacle 12 to 14 is able to be pushed or guided into the dishwashing compartment 2 in the insertion direction E (arrow) and be pulled or moved out of the dishwashing compartment 2 against the insertion direction E (arrow) in a direction A (arrow).

The inventive household appliance 1 can in a general way be a household dishwasher, a household washing machine or a household washer/dryer. Depending on the type of household appliance, the functional compartment can be a dishwashing compartment, a washing liquid compartment or a washing drum. A household washing machine of this type is known for example from publication EP 2 049 723 A1, while a household washer/dryer of this type is known from publication DE 33 45 303 A1. The related content of these publications given by way of example is herewith made subject matter of the present description.

Figure 2A:
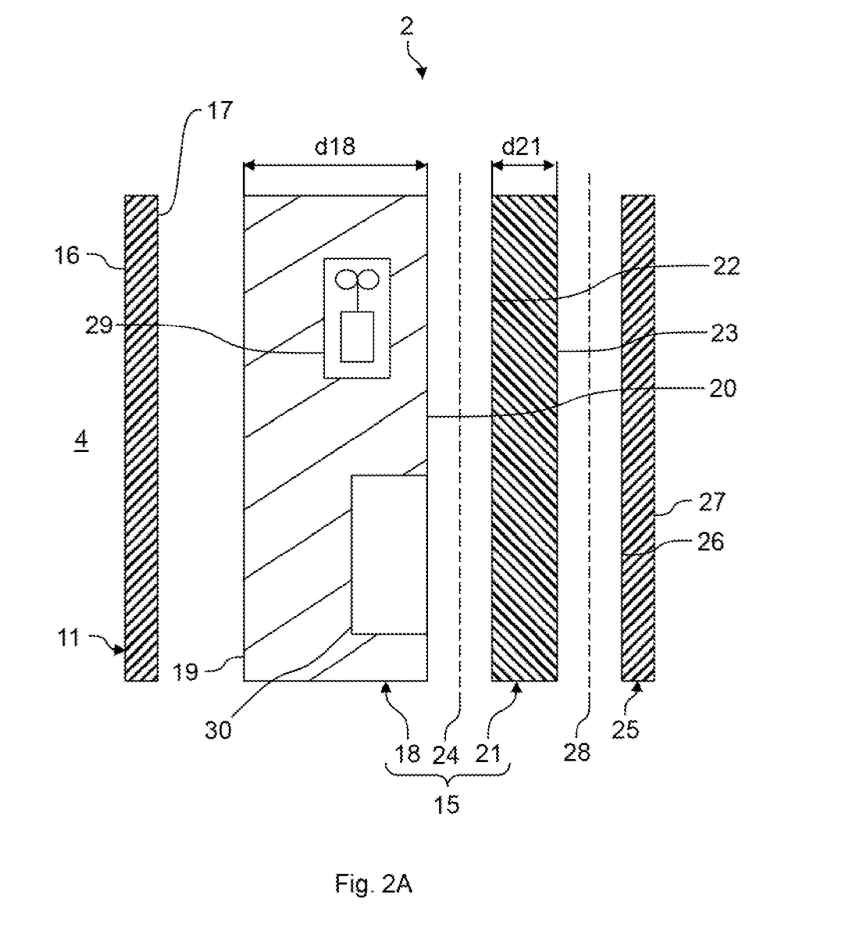
FIG. 2A shows a schematic side view of a dishwashing compartment of a form of embodiment for the household dishwasher in accordance with FIG. 1 in an exploded view.
Figure 3A:
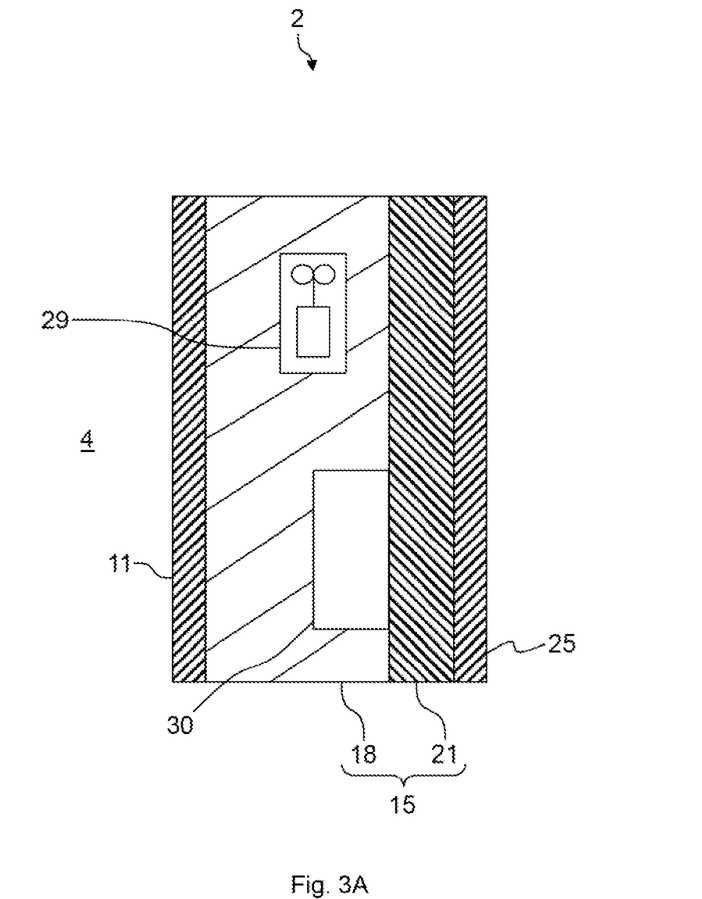
FIG. 3A shows a further schematic side view of the dishwashing compartment in accordance with FIG. 2A.

FIG. 2A shows a schematic part cross-sectional view of a form of embodiment of the dishwashing compartment 2 in an exploded view. FIG. 3A shows a further cross-sectional view of the dishwashing compartment 2. Only the side wall 11 of the dishwashing compartment is shown in FIGS. 2A and 3A. The household dishwasher 1 comprises an insulation arrangement 15 for thermal and/or acoustic insulation of the dishwashing compartment 2. The insulation arrangement 15 can be provided on the two side walls 10, 11, the roof 8, rear wall 9 and/or the door 3. The insulation arrangement 15 can further also be provided on the floor 7. This means that the dishwashing compartment 2 can be accommodated in the insulation arrangement 15 and it can surround or enclose said compartment at least to some extent. The insulation arrangement 15 is provided on the outer side of the dishwashing compartment 2. "On the outer side" here means directed away from the dishwashing space 4.

The side wall 11 in particular comprises an inner side 16, which is directed towards the dishwashing space 4, and an outer side 17, which is directed away from the dishwashing space 4. The insulation arrangement 15 is provided on the outer side 17. The insulation arrangement 15 comprises a first insulation element 18. The first insulation element 18 is suitable for insulating the dishwashing compartment 2 thermally and/or acoustically. The first insulation element 18 can also be referred to as the thermal and/or acoustic insulation element. The first insulation element 18 has a first surface 19, which is directed towards the outer side 17 of the side wall 11. Furthermore the first insulation element 18 comprises a second surface 20 directed away from the first surface 19. The first insulation element 18 is preferably produced from a foam plastic material, in particular from a foam polyurethane.

Preferably the first insulation element 18 has an open-pore structure, so that the first insulation element 18 is compressible. The plastic material has the property that, in a cured and/or cross-linked state, it preferably has gluing or preferably adhesive properties. The preferably adhesive properties are provided in particular on the surfaces 19, 20 of the first insulation element 18. In this case the plastic material itself has the preferably adhesive properties without the addition of an adhesive.

The fact that the first surface 19 preferably has adhesive properties enables the first insulation element 18 to adhere to the dishwashing compartment 2 or to the side wall 11 with the first surface 19 directed towards the dishwashing compartment 2. The connection between the side wall 11 and the first insulation element 18 is free from adhesive in this case. This means that no layer of adhesive is provided between the side wall 11 and the first insulation element 18. This enables the first insulation element 18 to be released from the side wall 11 in a non-destructive manner and also without leaving any residues. When the first insulation element 18 is released from the side wall 11 slight residues of the first insulation element 18 can also remain on the side wall 11. These residues can be easily rubbed off however.

The first insulation element 18 has a thickness d18. The thickness d18 preferably amounts to 5 to 50 mm, further preferably to 10 to 45 mm, further preferably to 15 to 40 mm, further preferably to 20 to 35 mm, further preferably to 25 to 30 mm. A density $\rho 18$ of the first insulation element 18 preferably amounts to 5 to 150 kg/m$^3$, especially preferably to 50 to 120 kg/m$^3$, further preferably to 70 to 100 kg/m$^3$. A specific thermal conductivity ($\lambda 18$) of the first insulation element 18 is preferably less than 0.1 W/(m*K), in particular less than 0.5 W/(m*K). The first insulation element 18 furthermore preferably has a specific thermal capacity c18 of less than 2.000 J(kg*K), preferably of less than 1.600 J(kg*K), further preferably of less than 1.400 J(kg*K).

As well as the first insulation element 18, the insulation arrangement 15 comprises a second insulation element 21 for acoustic insulation of the dishwashing compartment 2. The second insulation element 21 can also be referred to as an acoustic insulation element. The second insulation element 21 serves in particular as a bulk layer and improves the acoustic properties of the insulation arrangement 15. The second insulation element 21 is likewise provided on the outer side of the dishwashing compartment 2. In this case the first insulation element 18 is positioned between the dishwashing compartment 2 and the second insulation element 21. The second insulation element 21 comprises a first surface 22 directed towards the first insulation element 18 and a second surface 23 directed away from the first surface 22. Preferably the second insulation element 21 is able to be separated in a non-destructive manner from the first insulation element 18. The second insulation element 21 can however also be connected to the first insulation element 18 in a non-releasable manner.

The second insulation element 21 has a thickness d21. The thickness d21 is smaller than the thickness d18 of the first insulation element 18. For example the thickness d21 can amount to 1 to 10 mm, preferably to 1 to 8 mm, further preferably to 1 to 5 mm, further preferably to 1 to 3 mm. In particular the first insulation element 18 prevents heat being transmitted from the dishwashing compartment 2 to the second insulation element 21. This means that the second insulation element 21 cannot extract any heat from the dishwashing compartment 2. The energy efficiency of the household dishwasher 1 is thereby improved. In the second insulation element 21 vibrations of the dishwashing container 2 are converted into heat.

The first insulation element 18, as already mentioned, is suitable for damping vibrations. A loss factor of the plastic material of the first insulation element 18 is high and is tuned to its use in the household dishwasher 1. A "loss factor" here is to be understood with physical vibrations of different natures as the ratio of the loss-affected imaginary part to the loss-free real part of a complex variable. The loss factor of the plastic material of the first insulation element 18 at 20° C. is in particular greater than 0.2, preferably greater than 0.4. Furthermore the hysteresis factor in accordance with the IFD method (hysteresis loss—IFD) as per ASTM D3574 is preferably greater than 15%, preferably greater than 20%, especially greater than 30%, and the recovery time as per D3574 is preferably greater than 2 s, preferably greater than 4, especially greater than 5 s. The vibrations are partly also passed on to the second insulation element 21. The second insulation element 21 in the insulation arrangement setup 15 essentially makes a surface mass available through its high density.

The second insulation element 21 preferably has a far higher density than the first insulation element 18. The second insulation element 21 is preferably made of a bitumen material, in particular of a metal and/or stone-filled bitumen material, or of a plastic material, particularly of a metal and/or stone-filled plastic material. For example the second insulation element 21 can be made of a butyl material. The second insulation element 21 is in particular in the form of a plate or a mat. The second insulation element 21 can also be a sheet of metal, in particular a sheet of steel.

The second insulation element 21 serves to deaden the sound of the dishwashing compartment 2 or to damp vibrations of the dishwashing compartment 2. The second insulation element 21 preferably has as high a loss factor as possible. The loss factor of the material of the second insulation element 21 at 20° C. is preferably greater than 0.08, further preferably greater than 0.15. A density ρ21 of the second insulation element 21 is preferably greater than 1,000 kg/m³.

The insulation arrangement 15 can furthermore comprise an optional separation layer 24. The separation layer 24 is positioned between the first insulation element 18 and the second insulation element 21, in particular between the surfaces 20, 22. The separation layer 24 can be a layer of wax, a film, for example a polyethylene film or the like. The separation layer 24 can also comprise a number of films. The separation layer 24 makes possible a non-destructive and residue-free separation of the second insulation element 21 from the first insulation element 18.

The household dishwasher 1 furthermore comprises an outer casing 25. The outer casing 25 is arranged on the outer side of the insulation arrangement 15, in particular on the outer side of the second insulation element 21. The outer casing 25 can be a sheet of steel for example. The outer casing 25 can be part of a housing of the household dishwasher 1. The outer casing 25 can in particular also be part of the insulation arrangement 15.

The outer casing 25 comprises a first surface 26 directed towards the second insulation element 21 and also a second surface 27 directed away from the second insulation element 21. The outer casing 25 can either lie loosely on the second insulation element 21 or be connected to said element in such a way that the outer casing 25 can be released from the second insulation element 21 without leaving residues and non-destructively. To this end a separation layer 28 can be provided between the second insulation element 21 and the outer casing 25. The separation layer 28 is optional. The separation layer 28 can be constructed identically to the separation layer 24.

As well as the dishwashing compartment 2 and the insulation arrangement 15 attached to the outer side of the dishwashing compartment 2, the household dishwasher 1 further has one or more additional components 29, 30, which are arranged outside the dishwashing compartment 2 and inside the insulation arrangement 15. The components 29, 30 in this case are encapsulated by the plastic material from which the first insulation element 18 is made.

"Encapsulated" is to be understood here as the components 29. 30 being at least partially or completely surrounded or encapsulated by the plastic material of the first insulation element 18 during the production of the first insulation element 18.

The plastic material in this case is preferably formed from two components, which are mixed with one another and react chemically and/or physically with one another in such a way that the plastic material foams up and encloses the components 29, 30 at least to some extent within it. The components 29, 30 in this case can comprise water-conducting components, air-conducting components, water pockets, plastic parts for introducing a force into the dishwashing compartment 2, a fan, a motor, a spring, a cable, electrical leads or components, a fleece, a mat, a plastic component, a foam, a bitumen or the like. In FIGS. 2A and 3A the component 29 is shown as a fan.

As FIGS. 2A and 3A show, the plastic material of the first insulation element 18 surrounds the component 29 completely. This means that the component 29 is fully enclosed by the plastic material of the first insulation element 18. As an alternative the components 29, 30, as shown in FIGS. 2A and 3A with the aid of the component 30, can rest on the second insulation element 21 or be in contact with said element. In this case the component 30 is not completely surrounded by the plastic material of the first insulation element 18. The first insulation element 18 can further also be encapsulated onto the second insulation element 21.

Figure 2B:
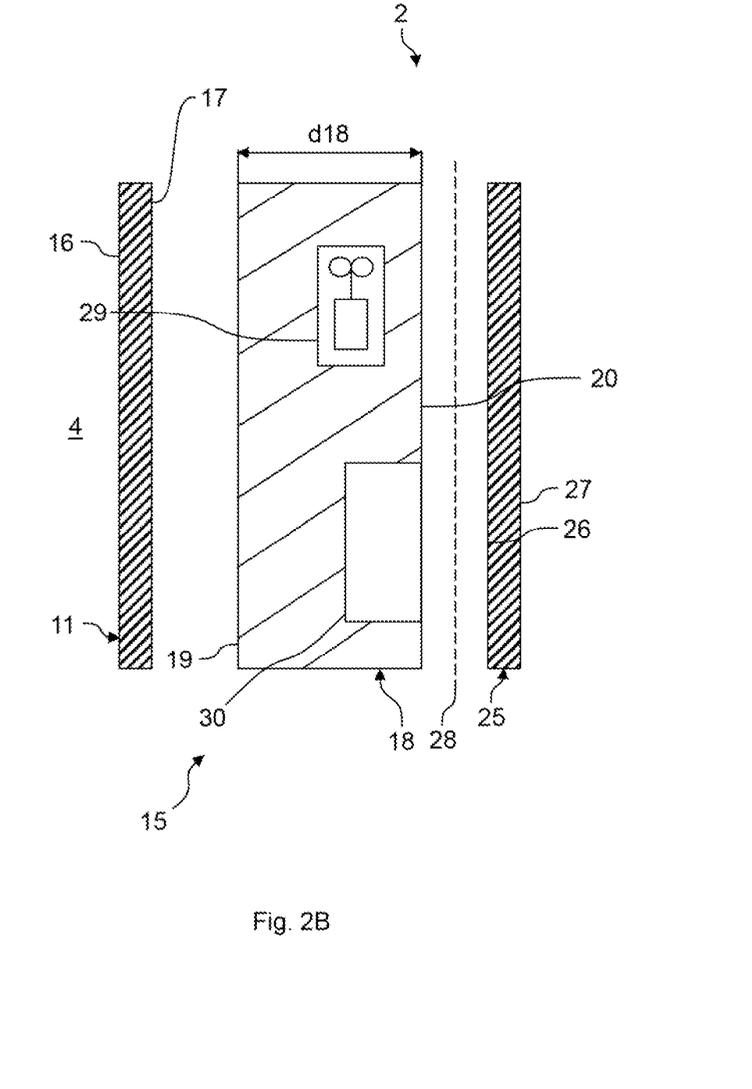
FIG. 2B shows a schematic side view of a dishwashing compartment of a form of embodiment for the household dishwasher in accordance with FIG. 1 in an exploded view.
Figure 3B:
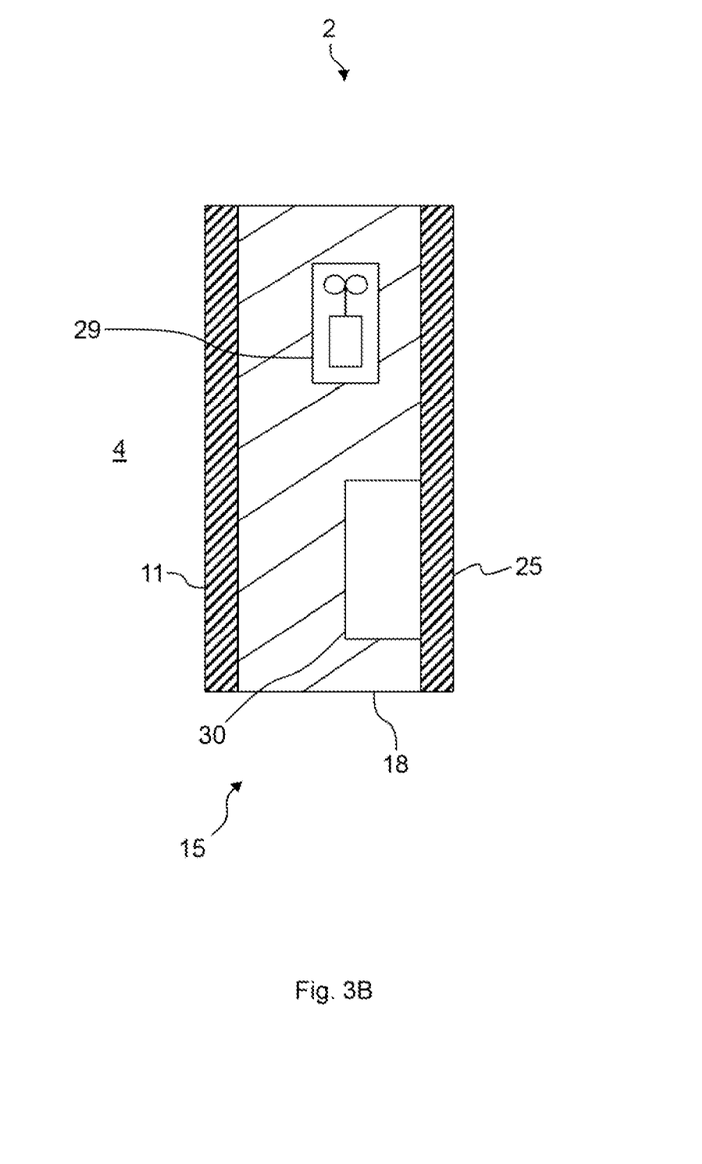
FIG. 3B shows a further schematic side view of the dishwashing compartment in accordance with FIG. 2B

FIG. 2B shows a schematic part cross-sectional view of a further form of embodiment of the dishwashing compartment 2 in an exploded diagram. FIG. 3B shows a further part cross-sectional view of the dishwashing compartment 2. The dishwashing compartment 2 in accordance with FIGS. 2B and 3B differs from the dishwashing compartment 2 in accordance with FIGS. 2A and 3A only in that the insulation arrangement 15 has just the first insulation element 18. The second insulation element 21 is especially not provided.

FIG. 4 to FIG. 10 show schematically a method for producing a household dishwasher 1 as previously explained. In a step S1 the dishwashing compartment 2 is provided. Before or during the provision of the dishwashing compartment 2, in the step S1, said compartment is produced from a sheet of steel for example, which is molded, for example expanded, and/or stamped.

Figure 4:
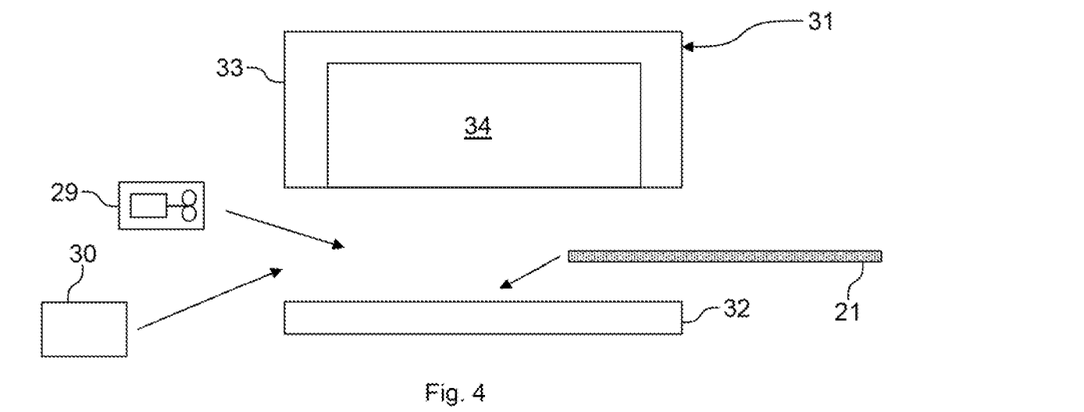
FIG. 4 shows a schematic cross-sectional view of a mold for producing an insulation element for the dishwashing compartment in accordance with FIG. 2A or FIG. 2B.
Figure 5:
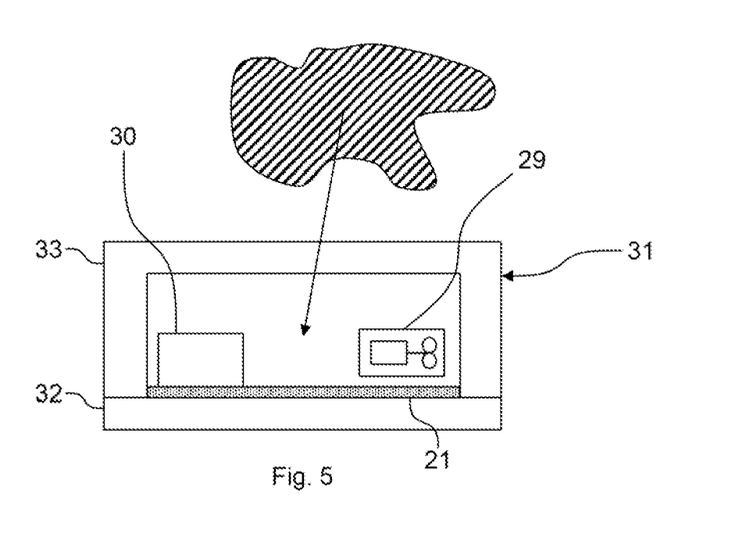
FIG. 5 shows a further schematic cross-sectional view of the mold in accordance with FIG. 4.
Figure 6:
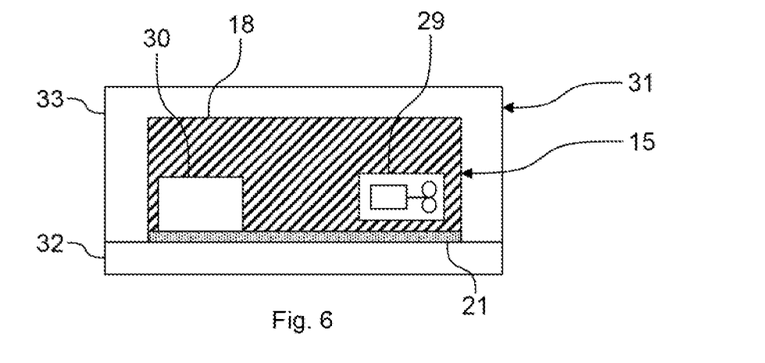
FIG. 6 shows a further schematic cross-sectional view of the mold in accordance with FIG. 4.

In a step S2 the component 29, 30 or the components 29, 30 is or are provided. In a step S3 the insulation arrangement 15 is produced. To this end, as shown in FIGS. 4 to 7, a mold 31, in particular a die casting mold or casting mold, which has a lower mold part 32 and an upper mold part 33, is filled with the plastic material. Before the mold 31 is filled with the plastic material the components 29, 30 are placed into the mold 31. Optionally the second insulation element 21 can be placed in the mold 31. The mold 31 comprises a cavity 34, which is a negative of a geometry of the first insulation element 18. After the components 29, 30 and/or the second insulation element 21 have been placed in the mold 31, it is filled with the liquid plastic material, as shown in FIG. 5. The plastic material is a polyurethane foam for example, as explained previously.

To produce the insulation arrangement 15 or the first insulation element 18 two components are mixed for example and are poured into the mold 31. The plastic material can then foam under atmospheric pressure or in a vacuum and fill out the cavity 34 completely. In this case the plastic material either surrounds the components 29, 30 completely or, as in the case of the component 30, at least to some extent. The component 29, when being foam-encapsulated with the plastic material, can be held in position in the cavity 34 with the aid or rods or wires for example. The component 30 can be laid on the second insulation element 21 or on the lower part of the mold 32 for positioning.

Figure 7:
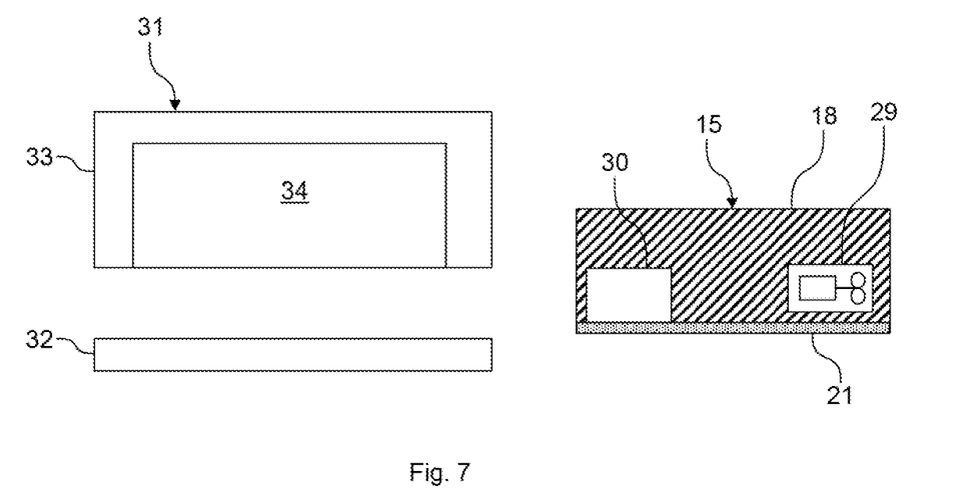

After the complete curing and/or cross-linking of the plastic material, the mold 31, as shown in FIG. 7, is opened and the first insulation element 18 or the insulation arrangement 15 are removed from it. In this case the surfaces 19, 20 of the first insulation element 18, even after the full curing and/or cross-linking of the plastic material of the first insulation element 18, are still preferably adhesive or preferably sticky. After they have been removed from the mold, the surfaces 19, 20 can be protected with the aid of a plastic film for example against dust and/or contaminations.

Figure 8:
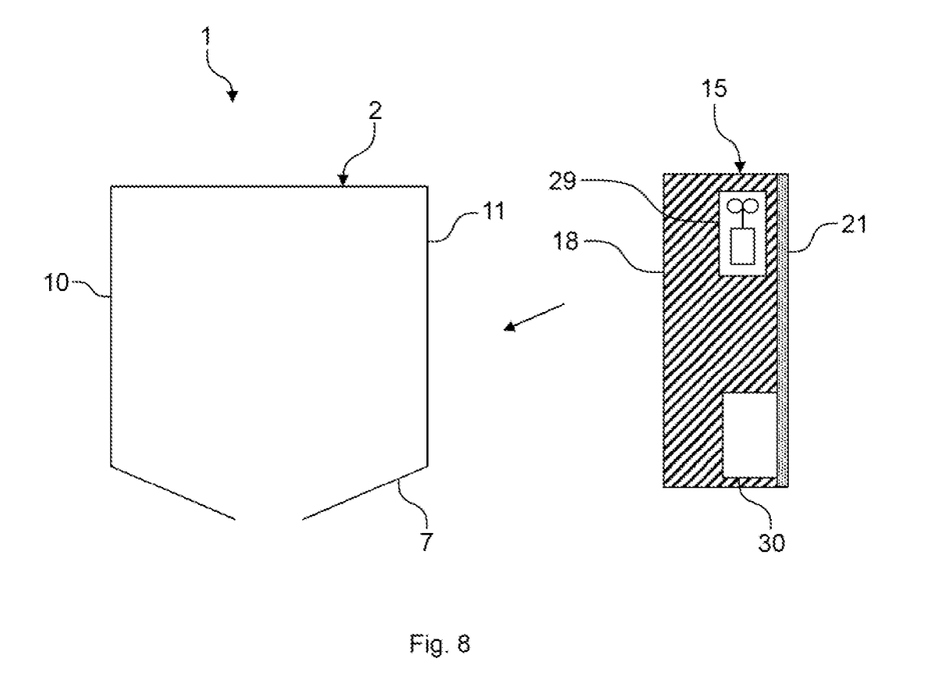
FIG. 8 shows a schematic cross-sectional view of the household dishwasher in accordance with FIG. 1.
Figure 9:
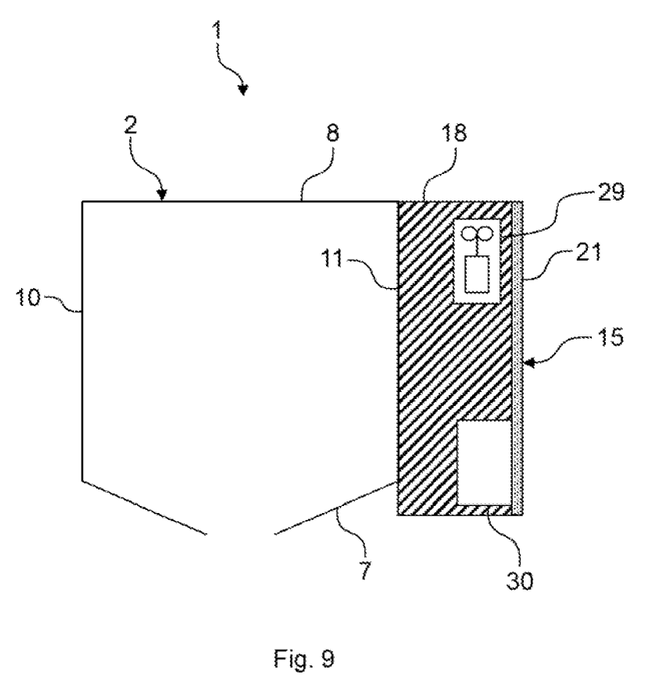
FIG. 9 shows a further schematic cross-sectional view of the household dishwasher in accordance with FIG. 1.
Figure 10:
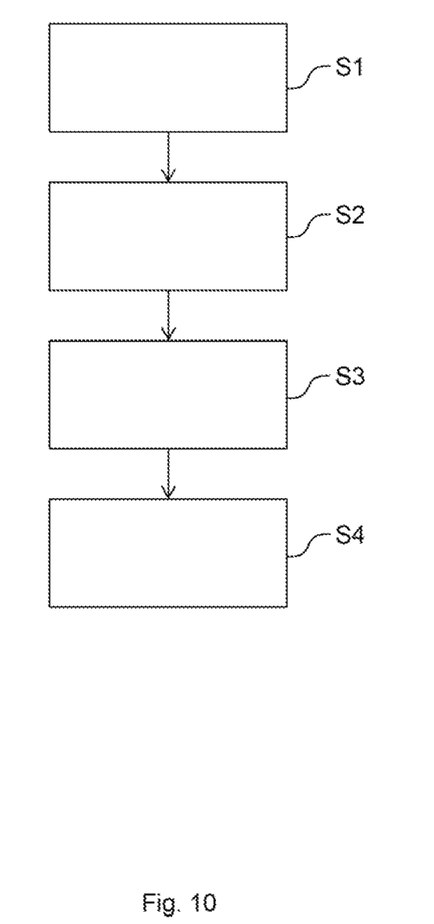
FIG. 10 shows a schematic block diagram of a form of embodiment of a method for producing the household dishwasher in accordance with FIG. 1.

In a step S4, as shown in FIGS. 8 and 9, the insulation arrangement 15 is attached to the outer side of the dishwashing compartment 2. To this end the first insulation element 18 can first be attached to the outer side of the dishwashing compartment 2. Then the second insulation element 21 can be attached to the outer side of the dishwashing compartment 2 in such a way that the first insulation element 18 is arranged between the dishwashing compartment 2 and the second insulation element 21. As previously mentioned, the first insulation element 18 can also be foamed directly onto the second insulation element 21. In this case the pre-assembled insulation arrangement 15 is attached in step S4 in its entirety to the outer side of the dishwashing compartment 2.

With the aid of encapsulation of the components 29, 30 with the plastic material of the first insulation element 18 additional functions can be integrated into the insulation arrangement 15. With the aid of encapsulation of the components 29, 30 the second insulation element 21 can also be mechanically fixed to the first insulation element 18. In this case the components 29, 30 are embodied as retaining means. Making full use of the available space of the first insulation element 18 without providing any tolerances is possible. A better acoustic damping of the components 29, 30 is produced in the event of said components being embodied as active components, such as motors or fans.

Although the present invention has been described with reference to exemplary embodiments, it is able to be modified in many ways.

The invention claimed is:

1. A household appliance, comprising:
a functional compartment;
an insulation arrangement provided on an outer side of the functional compartment for thermal and/or acoustic insulation of the functional compartment, said insulation arrangement including a first insulation element which is made in one piece from a plastic material selected such that a surface of the first insulation element in facing relation to the functional compartment adheres to the functional compartment and is separable therefrom in a non-destructive manner; and
a component arranged outside the functional compartment and at least substantially encapsulated by the plastic material of the first insulation element foaming onto the component such that the plastic material is between the component and the functional compartment.

2. The household appliance of claim 1, constructed in the form of a household dishwasher.

3. The household appliance of claim 1, wherein the functional compartment, is a dishwashing compartment.

4. The household appliance of claim 1, wherein the plastic material has an adhesive property in a cured and/or cross-linked state.

5. The household appliance of claim 1, wherein the plastic material is a polyurethane.

6. The household appliance of claim 1, wherein the plastic material is a foam polyurethane.

7. The household appliance of claim 1, wherein the component is a member selected from the group consisting of a water-conducting component, an air-conducting component, a water pocket, a plastic part for introducing a force into the dishwashing compartment, a fan, a motor, a spring, a cable, an electrical lead or component, a fleece, a mat, a plastic component, a foam, and a bitumen.

8. The household appliance of claim 1, wherein the first insulation material is configured to completely encapsulate the component.

9. The household appliance of claim 1, wherein the insulation arrangement includes a second insulation element, said first insulation element being arranged between the functional compartment and the second insulation element.

10. The household appliance of claim 9, wherein the component is in contact with the second insulation element.

11. The household appliance of claim 9, wherein the plastic material of the first insulation element is foamed onto the second insulation element.

12. A method for producing a household appliance, said method comprising:
producing a first insulation element of a plastic material as part of an insulation arrangement for thermal and/or acoustic insulation of a functional compartment;
encapsulating a component, arranged outside the functional compartment, by plastic material of the first insulation element foaming onto the component such that the plastic material is between the component and the functional compartment; and
attaching the insulation arrangement to the outer side of the functional compartment in such a way that a surface of the first insulation element in facing relation to the functional compartment adheres to the functional compartment and is separable therefrom in a non-destructive manner.

13. The method of claim 12, wherein the household appliance is a household dishwasher.

14. The method of claim 12, wherein the functional compartment is a dishwashing compartment.

15. The method of claim 12, wherein the plastic material has an adhesive property in a cured and/or cross-linked state.

16. The method of claim 12, wherein the component is encapsulated by placing the component into a mold, which is filled with the plastic material.

17. The method of claim 12, further comprising arranging the first insulation element between the functional compartment and a second insulation element of the insulation arrangement.

* * * * *